(12) United States Patent
Srinivasmurthy et al.

(10) Patent No.: US 9,372,644 B2
(45) Date of Patent: Jun. 21, 2016

(54) SENDING A JOB PROCESSING NOTICE TO A SOCIAL NETWORK CONTACT

(75) Inventors: Venugopal K. Srinivasmurthy, Bangalore (IN); Rajesh Muthukrishnan, Bangalore (IN); Ramesh Kavanapillil, Bangalore (IN); Shankaranarayana Viswanatha, Bangalore (IN); Sowjanya Shetty, Bangalore (IN); Bibhu Biswal, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 382 days.

(21) Appl. No.: 13/482,787

(22) Filed: May 29, 2012

(65) Prior Publication Data

US 2013/0321831 A1 Dec. 5, 2013

(51) Int. Cl.
G06F 3/12 (2006.01)

(52) U.S. Cl.
CPC .............. *G06F 3/1203* (2013.01); *G06F 3/126* (2013.01); *G06F 3/1288* (2013.01); *G06F 3/1259* (2013.01)

(58) Field of Classification Search
None
See application file for complete search history.

(56) References Cited

U.S. PATENT DOCUMENTS

| | | | |
|---|---|---|---|
| 7,248,383 B2 | 7/2007 | Yoshida et al. | |
| 7,586,636 B2 | 9/2009 | Karaoguz et al. | |
| 7,623,256 B2 | 11/2009 | Ciriza et al. | |
| 7,812,948 B2 | 10/2010 | Honda et al. | |
| 8,264,725 B1 | 9/2012 | Pillutla et al. | |
| 8,537,399 B2 | 9/2013 | Ganesan et al. | |
| 9,081,533 B1* | 7/2015 | West | G06F 3/1272 |
| 2002/0065741 A1 | 5/2002 | Baum | |
| 2003/0076528 A1 | 4/2003 | Parry et al. | |
| 2004/0064506 A1 | 4/2004 | Ohara | |
| 2004/0196491 A1* | 10/2004 | Uchino | G06F 21/608 358/1.15 |
| 2006/0290963 A1* | 12/2006 | Sakuraba | G06F 3/1204 358/1.13 |
| 2007/0146772 A1 | 6/2007 | Castellani | |
| 2009/0248632 A1 | 10/2009 | Subramanian | |
| 2010/0123922 A1 | 5/2010 | Condello et al. | |
| 2010/0188689 A1 | 7/2010 | Gnanasambandam et al. | |
| 2010/0302590 A1 | 12/2010 | Matsubayashi et al. | |
| 2010/0309508 A1 | 12/2010 | Kamath et al. | |
| 2011/0063667 A1 | 3/2011 | Nishida | |
| 2011/0090529 A1* | 4/2011 | Hertling | G06F 3/1204 358/1.15 |
| 2011/0258535 A1 | 10/2011 | Adler, III et al. | |

(Continued)

FOREIGN PATENT DOCUMENTS

| | | | | |
|---|---|---|---|---|
| IN | 1369MUM2011 | | 7/2011 | |
| WO | WO 2012048347 | * | 4/2012 | |
| WO | WO 2012048347 A1 | * | 4/2012 | H04L 9/0822 |

OTHER PUBLICATIONS

Kern, J.; "Page Path Technologies Announces Twitter Print for the Print Industry"; Jan. 30, 2009; 3 pages.

(Continued)

*Primary Examiner* — Hilina K Demeter
(74) *Attorney, Agent, or Firm* — HP Inc. Patent Department

(57) ABSTRACT

In one embodiment, a directive is received at a computer system. The directive is to send to social network contacts of a sharer user, via a web application, processing information relating to print or scan jobs associated with the sharer user. Data is received, the data indicative of first processing of a print or scan job associated with the sharer user. A notice of the first processing is sent to a first social network contact of the sharer user via the web application.

17 Claims, 9 Drawing Sheets

(56) References Cited

U.S. PATENT DOCUMENTS

| | | | |
|---|---|---|---|
| 2011/0270813 A1 | 11/2011 | Cok et al. | |
| 2011/0315755 A1 | 12/2011 | Koakutsu | |
| 2012/0300249 A1* | 11/2012 | Shustef | G06F 3/1287 358/1.15 |
| 2013/0318347 A1* | 11/2013 | Moffat | H04L 63/08 713/168 |

OTHER PUBLICATIONS

Non-Final Office Action received in related U.S. Appl. No. 13/222,336, Feb. 2, 2012, 8 pages.

Ragnet, F., "Social Networking for printers?" (Web Page), Nov. 8, 2007, found at http://www.twitterprint.net/about_us.htm.

* cited by examiner

SENDING A JOB PROCESSING NOTICE TO A SOCIAL NETWORK CONTACT

BACKGROUND

Certain internet-connected printers are capable of sending and receiving communications and printable content via the Internet without being connected to a desktop computer, notebook computer, or other host computing device. Such functionality can provide considerable flexibility and efficiencies for a user, as the user may have the ability to download and print content at familiar and unfamiliar printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Figure 1:
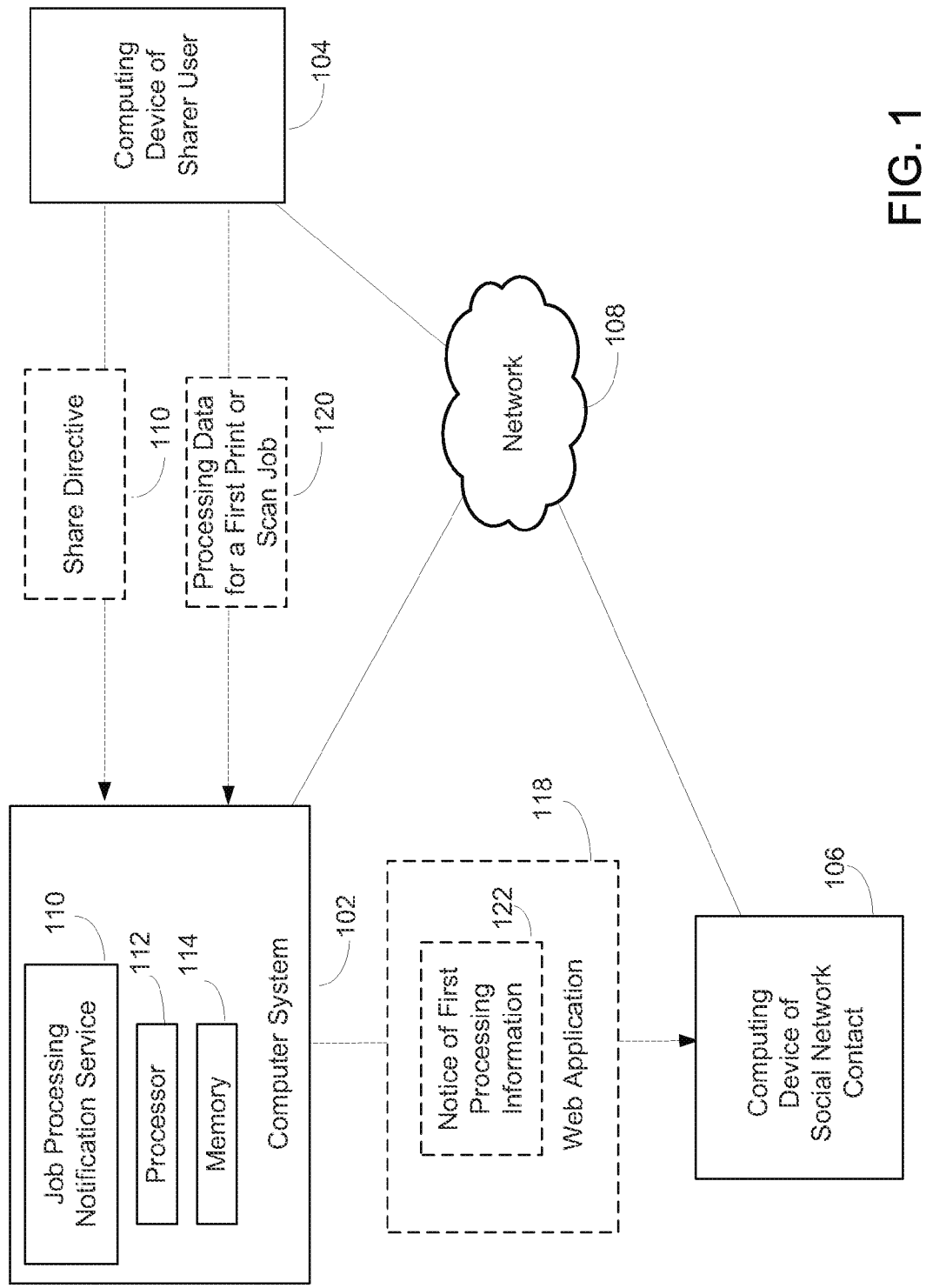
FIG. 1 is a block diagram illustrating a system according to various embodiments.

An advantage of an internet-connected printer is that content can be retrieved and printed at the printer without the printer being connected to a host computing device. A limitation to this advantage has been the ability for a user of such a printer to easily obtain content from users of other printers in a trouble-free and efficient manner. For example, a user of a first internet-connected printer may obtain printable content from a second network-connected printer via an exchange of emails between the printers, including an email sent to the first printer from the second printer with the content as an attachment. However, using email in this manner to obtain content can be unwieldy in some use cases due to the length of the email addresses (e.g., when the addresses are supplied by a user), frequency of changes to email addresses (e.g., user changes or changes coinciding with a changed IP address), and/or the number of printers from which the first printer will obtain content. Other file sharing protocols that necessitate a user of the first printer repeatedly provide an IP address or other identifier to obtain content from other printers, or that necessitate that a user of the second printer repeatedly provide an IP address or other identifier to share content, have similar limitations.

Accordingly, various embodiments described herein were developed to enable a user of a network connected printer to share a print job, and information relating to the print job, with other users of network connected printers that are social network contacts of the sharing user. Embodiments described herein also enable a sharing user to share a scan job processed at the printer, and information relating to the scan job, with other users that are social network contacts. In an example, a directive is received at a computer system from a computing device at the initiation of a sharer user. The directive is to send to social network contacts of a sharer user, via a web application, processing information relating to print jobs or scan jobs associated with the sharer user. In response to receiving data indicative of processing of a print or scan job associated with the sharer user, the computer system sends notification of the first processing to social network contacts of the sharer user via the web application.

Advantages of the disclosure include that users of network connected printers can now easily share print and jobs, and easily communicate information regarding the print and scan jobs, via a social network. User satisfaction with network-connected printers and printing will be increased as users access a web application that provides, after permissions are granted by the sharing users, visibility as to what is being is being printed by social contacts. In examples, the social contacts will have the ability to print such content in an easy manner via interaction the web application. In embodiments, users can set visibility and content sharing restrictions regarding print jobs and scan jobs according to social contact groups. User satisfaction will further increase as the users of network connected printers enjoy a sense of community through their shared printing and scanning activities.

As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing. A "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, or an internet. A "directive" refers to an instruction, order, command, or direction. A "web application" refers to a computer software application or web page that is coded in a browser-supported language (such as HTML, or HTML with JavaScript) and is reliant on a web browser application to render the application executable (or in the case of a web page, presentable). Examples of web applications are web pages, webmail, online search engines, online sale and auction sites, and wikis. "Content" refers to text, images, and/or other subject matter or other information that can be received by a computer system for printing, and/or stored at the computer system, e.g., for later printing ("subject matter content"). In some cases "content" may additionally include instructions as to formatting and presentation of the subject matter content ("instruction content"). A "printer application" refers to a software application that is accessible to a user at a network-connected printer and that enables retrieval of content, via the network, from computing devices external to the printer. A "print job" refers to instructions and/or content for printing that can be stored in a programming language and/or numerical form so that it can stored and used in computing devices, servers, printers and other machines capable of performing calculations and manipulating data. "Rasterizing" content refers to processing or rendering of content to a format that can be understood and/or better understood by a printer. A "scan job" refers to instructions relating to and/or digitized content from scanning that can be stored in a programming language and/or numerical form so that it can stored and used in computing devices, servers, printers and other machines capable of performing calculations and manipulating data. "Scan job" includes instructions relating to and/or digitized content from scanning that is part of a copying operation, e.g., making photocopies of hard copy content.

As used in this application, a "social network" refers to a group or set of computer users that are in an online trust-based relationship that grants access and/or sharing privileges such that the users are "contacts" to each other, and each connected user is a "contact" with respect to the other. Such a trust relationship may be based on prior real-world or online experiences between the first and second users or the trust relationship may be created indiscriminately. For example, in one embodiment of a social network service if a first user sends a social network contact invitation to a second user, and the second user accepts the invitation, a connection between contacts is established. This connection between contacts may enable the first user to access or add to some or all of the content of the second user's personal page (e.g. status postings, pictures, and lists of other connections) and vice versa. Such social networking services may provide a variety of ways for "contacts" to interact, e.g. e-mail, instant messaging, video conferencing, document sharing and accessing each other's personal web pages. It should be noted that the terms "social network contact" and "contact" are to be construed broadly as social networking applications and web sites use a multitude of similar terms to indicate a trust relationship. For example, while some social networking web sites and applications use the word "contact" to designate a trust relationship, other social networking web sites and applications will use alternative words to demonstrate an online contact. For example, various social networking web sites and applications use terms such as "friend, "follower", "classmate", and "connection" to indicate a trust relationship. As used in this application, "contact" includes these and any other designations of trust utilized by a social networking web site or application.

FIG. 1 shows a computer system 102 electronically connected to a sharer user computing device 104 and a social network contact computing device 106 via a network 108. Computer system 102 represents generally any computing device or group of computing devices configured to send and receive network requests, send and receive data, and/or otherwise communicate with, sharer user computing device 104 and social network contact computing device 106. In examples, computer system 102 may be or include a server, desktop computer, notebook computer, mobile device, tablet computer, and/or any other computing device. Sharer user computing device 104 represents generally any computing device or group of computing devices configured to send and receive network requests, send print job and/or scan job share directives, send print and/or scan job processing data and other data to, and otherwise communicate with, computer system 102. Social network computing device 106 represents generally any computing device or group of computing devices configured to send and receive network requests and data, receive print and scan job processing information via a web application, and otherwise communicate with computer system 102.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between computer system 102, sharer user computing device 104, and social network contact computing device 106 as depicted in FIG. 1 represent the logical communication paths between these devices, not necessarily the physical paths between the devices.

Computer system 102 is shown to include a job processing notification service 110, a processor 112, and a memory 114. Job processing notification service 110 represents generally any combination of hardware and programming configured to enable a computer user to share a print job or scan job that is associated with that computer user, with other computer users that are social network contacts of the sharing user. Processor 112 represents generally any instruction execution system, such as a computer/processor based system or an ASIC (Application Specific Integrated Circuit), a computer, or other system that can fetch or obtain instructions or logic stored in memory 114 and execute the instructions or logic contained therein. Memory 114 represents generally any memory configured to store program instructions and other data.

In the example of FIG. 1, the job processing notification service 110 executing at computer system 102 receives a directive from sharer user computing device 104, sent at the initiation of a user of a network connected printer (a "sharer user"). The directive is for the job processing notification service 110 to send to social network contacts of the sharer user, via a web application 118, processing information relating to print or scan jobs associated with the sharer user. The job processing notification service 110 receives data 120 indicative of first processing of a print or scan job associated with the sharer user. In an example, the first processing data may be data indicative of the sharer user initiating a print request a computing device 104. In another example, the first processing data may be data indicative of receipt at computer system 102 of a print request initiated by the sharer user at computing device 104. In another example, the first processing data may be data indicative of actual printing of a hard copy of a print job pursuant to a print request made by a sharer user at computing device 104, or at another computing device in electronic connection with computing device 104. In an example, a first user may send an invitation to a second user to be a connection. In another example, the first processing data 120 may be data indicative of a scan job. In yet another example, the first processing data 120 may be a scan job that is the result of a scan operation performed by a sharer user at computer device 104.

Responsive to receipt of the job processing data 120, the notification service 110 sends a notice 122 of the first processing to a first social network contact of the sharer user via the web application 118. In this example, the notification service 110 sends the notice to computing device 106, a computing device that is associated with a user that is a social network contact of the sharer user, via the web application 118. In an example the computing device 106 may be "associated with" a social network user by virtue of being associated with the user in a database or registry accessible to notification service 110. In another example computing device 106 may be "associated with" a social network user by virtue of notification service 110 determining, e.g., via a user directory or other user authorization service, e.g., via a Lightweight Directory Access Protocol ("LDAP") or other network protocol.

In examples, the notification service 110 is additionally configured to provide, via the web application, an opportunity for the social network contact user at computing device 106 to print the print job that is shared by the sharer user. In an example, notification service 110, responsive to receipt from computing device 106 via the web application 118 of a request from the social network contact to print the job, sends the print to computing device 106.

The functions and operations described with respect to job processing notification service 110 and computer system 102 may be implemented as a non-transitory computer-readable storage medium containing instructions executed by a processor (e.g., processor 112) and stored in a memory (e.g., memory 114). In a given implementation, processor 112 may represent multiple processors, and memory 114 may represent multiple memories. Processor 112 represents generally any instruction execution system, such as a computer/processor based system or an ASIC (Application Specific Integrated Circuit), a computer, or other system that can fetch or obtain instructions or logic stored in memory 114 and execute the instructions or logic contained therein. Memory 114 represents generally any memory configured to store program instructions and other data.

Figure 2:
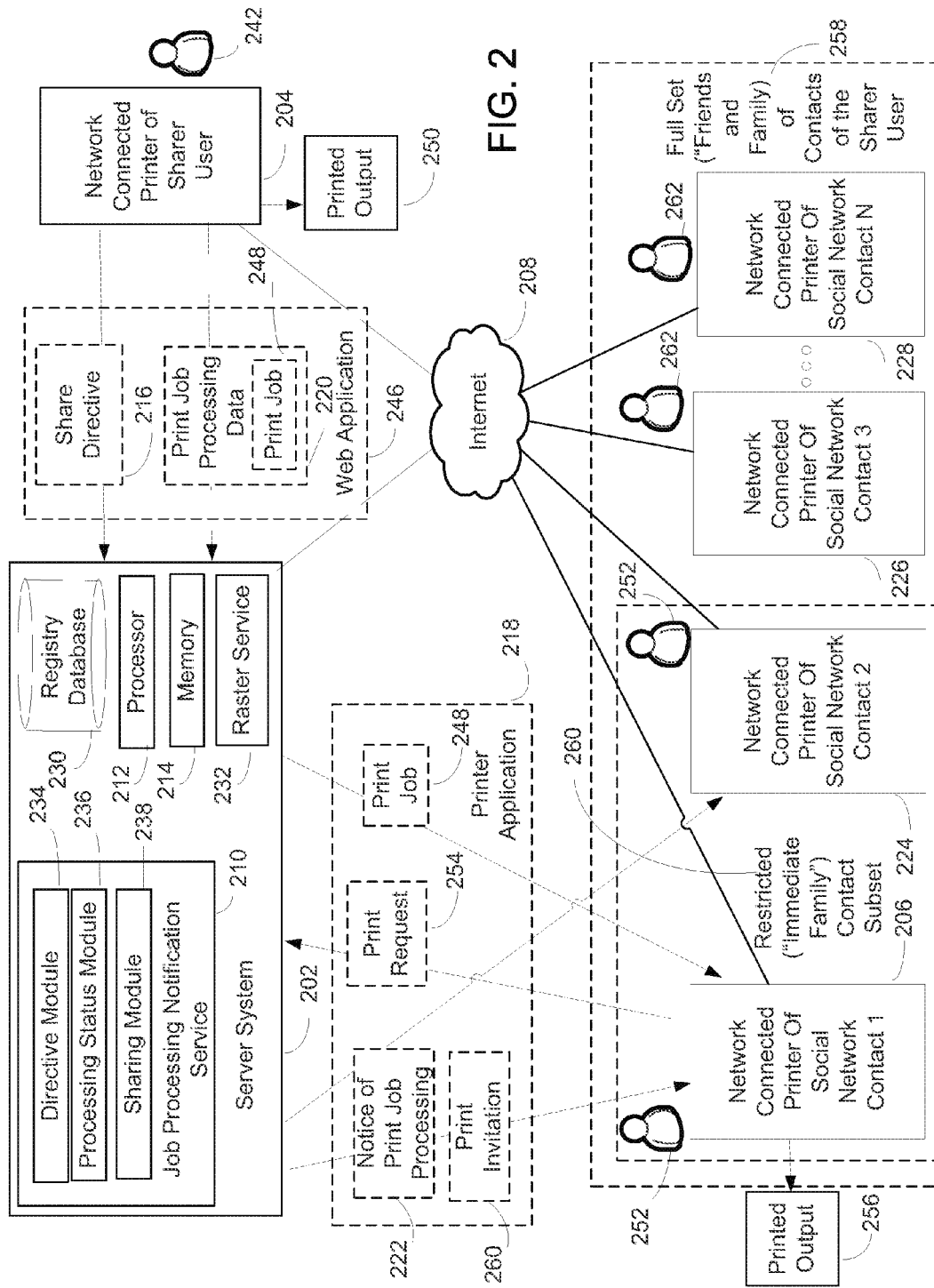
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202 electronically connected to a sharer user internet connected printer 204, a Social Network Contact 1 internet connected printer 206, a Social Network Contact 2 internet connected printer 224, a Social Network Contact 3 internet connected printer 226, and a Social Network Contact N internet connected printer 228. Server system 202 represents generally any computing device or group of computing devices configured to send and receive internet requests, send and receive data, and/or otherwise communicate with, sharer user internet connected printer 204 and internet connected Social Network Contacts Printers "1-N" 206 224 226 228. In examples, server system 202 may be or include a server, desktop computer, notebook computer, mobile device, tablet computer, and/or any other computing device.

Internet connected sharer user printer 204 represents generally any computing device or group of computing devices operable to produce a printed print job or printed content, and additionally operable to send and receive internet requests, send print job and/or scan job share directives, send print and/or scan print job processing data and other data to, and otherwise communicate with, server system 202.

Internet connected Social Network Contacts Printers "1-N" 206 224 226 228 each represent generally a computing device that is operable to produce a printed print job or printed content, and additionally operable to send and receive internet requests and data, receive print job processing information via a web application, and otherwise communicate with server system 202.

Internet 208 represents generally hardware components and computers interconnected by communications channels that allow sharing of resources and information over an internet or intranet network, or over a combination of both. Internet 208 may include a cable, wireless, fiber optic, or remote connection via a telecommunication link, an infrared link, a radio frequency link, or some combination of these, or any other connectors or systems that provide electronic communication. Internet 208 may also include intermediate proxies, routers, switches, load balancers, and the like. The paths followed by internet 208 between server system 202, sharer internet connected printer 204, and internet connected Social Network Contact Printers "1-N" 206 224 226 228 as depicted in FIG. 2 represent the logical communication paths between these devices, not necessarily the physical paths between the devices.

Server system 202 is shown to include a print job processing notification service 210, a registry database 230, a raster service 232, a processor 212, and a memory 214. Print job processing notification service 210 represents generally any combination of hardware and programming configured to enable a user of an internet connected printer to share a print job with other computer users that are social network contacts of the sharing user. The service 210 includes a directive module 234, a processing status module 236, and a sharing module 238. Registry database 230 represents generally a database, registry, lookup table or list that associates internet connected printers with users that are social network contacts of a sharer user 242. Raster service 232 represents generally any combination of hardware and programming configured to perform a rasterization event with respect to a print job. In an example, a rasterization event may include utilizing vector digital instructions as to how the content is to be printed to create a high resolution raster or bitmap image of the content. The instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged image File Format), PCL3 (Printer Command Language 3) and PCL 6 (Printer Command Language 6). In an example, the rendering may apply smoothing or interpolation algorithms to an input bitmap of the content to generate an output bitmap image. Processor 212 represents generally any instruction execution system, such as a computer/processor based system or an ASIC (Application Specific Integrated Circuit), a computer, or other system that can fetch or obtain instructions or logic stored in memory 214 and execute the instructions or logic contained therein. Memory 214 represents generally any memory configured to store program instructions and other data.

In the example of FIG. 2, directive module 234, included within print job processing notices service 210 and executing at server system 202, receives from network connected printer 204 a share directive 216 to send to social network contacts of a sharer user 242, via a web application 246, processing information relating to print jobs associated with sharer user 242. In this example, the directive restricts the sending processing information to a restricted contact set named "Immediate Family" 260 if a print job is designate as a "Personal" or "Our Family Only" security type. The share directive instructs that for all other print jobs (i.e., those print jobs not identified as "Personal" or "Our Family Only"), the processing information is to be sent to the full set 258 of social network contacts of the sharer user 242.

Processing status module 236 receives, from sharer user computing device 204, print job processing data 220 indicative of processing of a print job 248 associated with the sharer user 242. In this example, the processing data 220 is indicative of raster processing of the print job at the server system 202. In this example, the print job processing data 220 that is received by the processing status module 236 from the sharer user computer 204 includes the print job 248 itself. The print job processing data 220 is indicative that the print job 248 has been classified by the sharer user 242 as being for "Our Family Only." In an example, the sharing module 238 in determining which computing devices should receive the notice 222 accesses the registry database 230 that stores associations of computing device addresses with social network contacts of user 242. The registry database 230 may additionally include data defining social network contact sets and subsets, such as the "Friends and Family" contact set 258 and "Immediate Family" contact subset 260 in the example of FIG. 2.

Responsive to the processing status module's 236 receipt of the print job processing data 220 with the print job 248, the sharing module 238 sends a notice 222 of the print job processing to the internee connected Social Network Contact 1 Printer 206 and Social Network Contact 2 Printer 224 via a printer application 218. Sending of the notice 222 is limited to these computing devices within the restricted "Immediate Family" contact subset 260, rather than the entire "Family and Friends" contact set 258, because the print job processing data 220 received by the processing status module 236 indicates the print job 248 was classified by the sharer user 242 as "Our Family Only." in an example, the notice of print job processing 222 is sent to the Social Network Contact 1 Printer 206 and Social Network Contact 2 Printer 224 in a format that is displayable to "Immediate Family" social contacts 252 of the sharer user 242 via one or more visual display devices (e.g., a monitor, touchscreen, or display screen). In other examples, the notice of print job processing 222 may be sent in a format that is displayable to social contacts of the sharer user 242 via a non-visual display device, (e.g. displayable via an audio display device or tactile display device).

In the example of FIG. 2, the notification service 210 additionally provides to Social Network Contact 1 Printer 206 and Social Network Contact 2 Printer 224, via the printer application 218, an opportunity or invitation 260 for the social network contact users 252 that utilize these computing devices "1-N" 206 224 to print the print job 248. In an example, the notification service 210, receives from computing device 206 via the printer application 218 a request 254, initiated by a Social Network Contact 2 Printer of sharer user 242, to print the print job 248. Responsive to receipt of the print request 254, the sharing module 238 sends the print job 248 to the Social Network Contact 1 Printer 206 for printing. The Social Network Contact 1 Printer 206 in turn produces a printed hard copy 256 of the print job 248. In an example, the print job 248 is sent to the Social Network Contact 1 Printer 206 in a rasterized format, with the raster processing occurring at the raster service that executes at server system 202.

Figure 3A:
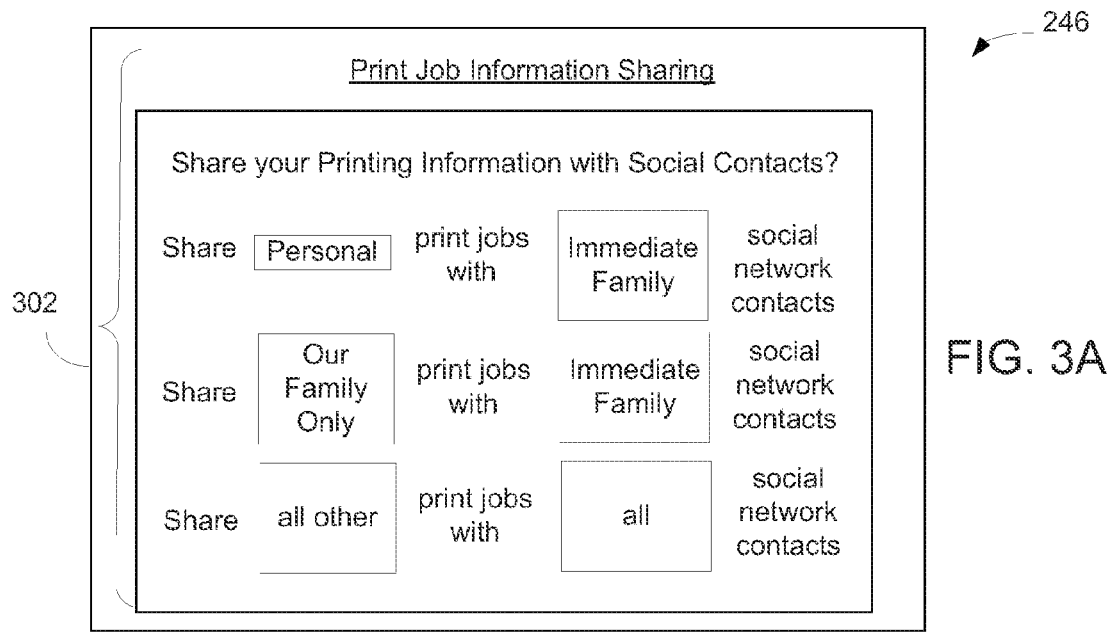
FIGS. 3A, 3B, and 3C are screen shots of a web application.
Figure 3B:
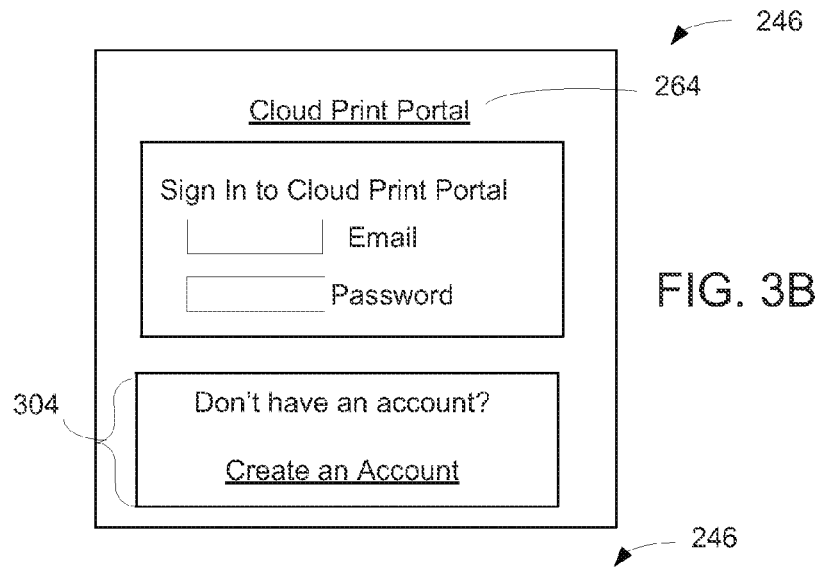
Figure 3C:
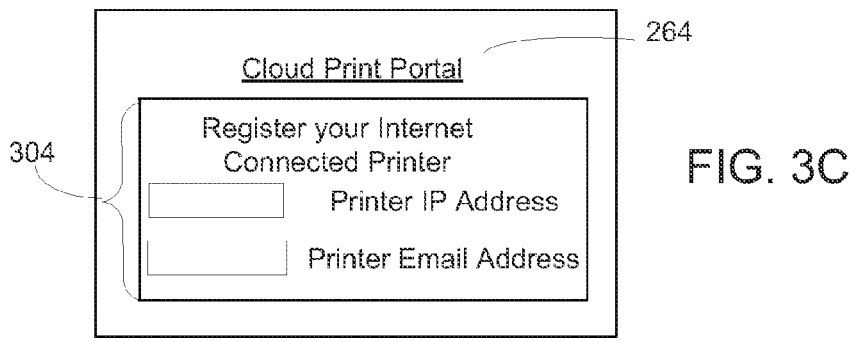

FIGS. 3A, 3B, and 3C are example screen shots of the web application 246 that is configured to receive a share directive 216 and print job processing data 220 from the sharer user computing device 204, and to communicate the directive and data to the print job processing notification service 210 executing at server system 202. In an example the web application 246 is accessible at any computing device with a web browser. In another example, the web application 246 is a printer application accessible at an internet connected printer such as sharer user printer 204. FIG. 3A illustrates a web application that enables a sharer user 242 of internet connected printer 204 to trigger sharing of print jobs by interacting (e.g., via a mouseclick, interaction with a touchscreen, etc.) with a print job information sharing interface 302 that is included in the web application 246. In the example of FIG. 3C, the sharer user 242 has interacted with the interface 302 to direct that processing information relating to "Personal" and "Our Family Only" print jobs will be shared with the sharer user's "Immediate Family" social network contacts. The sharer user 242 has directed via the interface 302 that processing information relating to prints jobs that are not designated as "Personal" or "Our Family Only" print jobs will be shared with all social network contacts of the sharer user 242.

FIGS. 3B and 3C illustrate that web application 246 may additionally include a printer registration interface 304 or other functionality to enable a user of a computing device to register an internet connected printer such as printer 204 to a cloud print service associated with the portal interface 264. In examples, the web application 246 may also include functionality to enable a user to configure and customize the cloud print service for a particular internet connected printer, and to enable and disable printer application access with respect to a particular internet connected printer.

Figure 4:
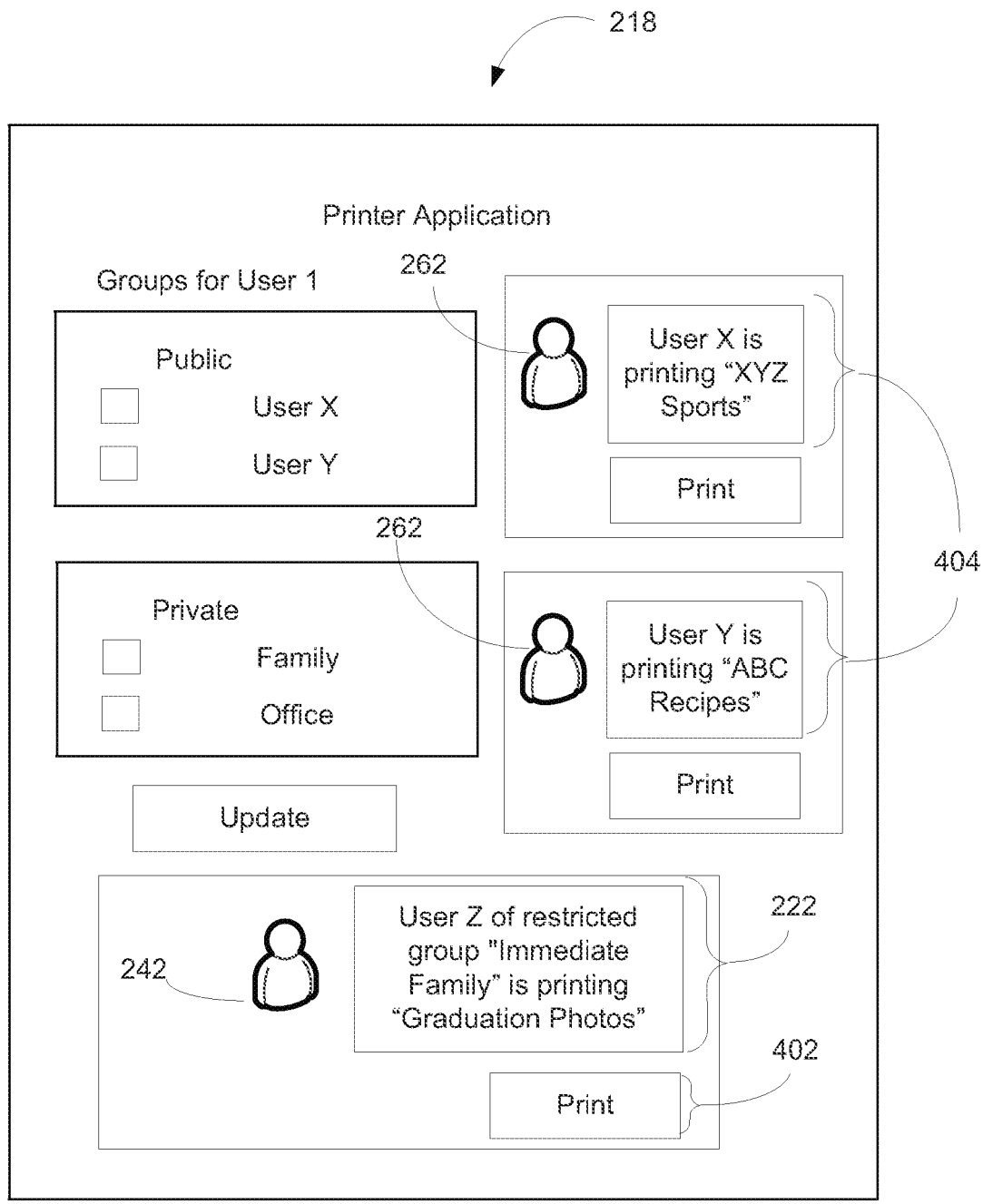
FIG. 4 is a screen shot of a printer application.

FIG. 4 is an example screen shot of a printer application 218 configured to communicate to social network contacts of sharer user 242 a notice of processing 222 of a print job associated with the sharer user. The screenshot provides an example of what a user 252 that is a social contact of the sharer user 242 might view at a visual display at Social Network Contact 1 Printer 206 as the result of the sharing module 238 at server system 202 sending, via the printer application 218, notice 222 of the first processing of the print job 248. In this example, the notice 222 communicates that the print job 248 is a restricted print job available to the "Immediate Family" contacts of sharer user 242. The printer application 218 additionally provides the social contact user with a print instruction interface 402 to direct the sending of a print request 254 to the print job processing notification service 210 executing at the server system 202. In the example of FIG. 4, the printer application 218 as viewable by the social network contact 252 at the Social Network Contact 1 Printer 206 also displays process status 404 of jobs being printed by other social network contacts 262 of the social network contact 252.

In other examples, what is shown in FIG. 1 as printer application 218 may be a web application accessible at any computing device with a web browser, rather than a printer application. In an example, the printer application 218 or web application is the same web application 246 that is accessible to the sharer user 242 for registration of internet connected printers and communication of print job sharing instructions to the print job processing notification service 210. In another example, the printer application 218 or web application is distinct from the web application 246 that enables the sharer user 242 to communicate print job sharing instructions to the print job processing notification service 210.

The functions and operations described with respect to print job processing notification service 210 and server system 202 may be implemented as a non-transitory computer-readable storage medium containing instructions executed by a processor (e.g., processor 212) and stored in a memory (e.g., memory 214). In a given implementation, processor 212 may represent multiple processors, and memory 214 may represent multiple memories. Processor 212 represents generally any instruction execution system, such as a computer/processor based system or an ASIC (Application Specific Integrated Circuit), a computer, or other system that can fetch or obtain instructions or logic stored in memory 214 and execute the instructions or logic contained therein. Memory 214 represents generally any memory configured to store program instructions and other data.

Figure 5:
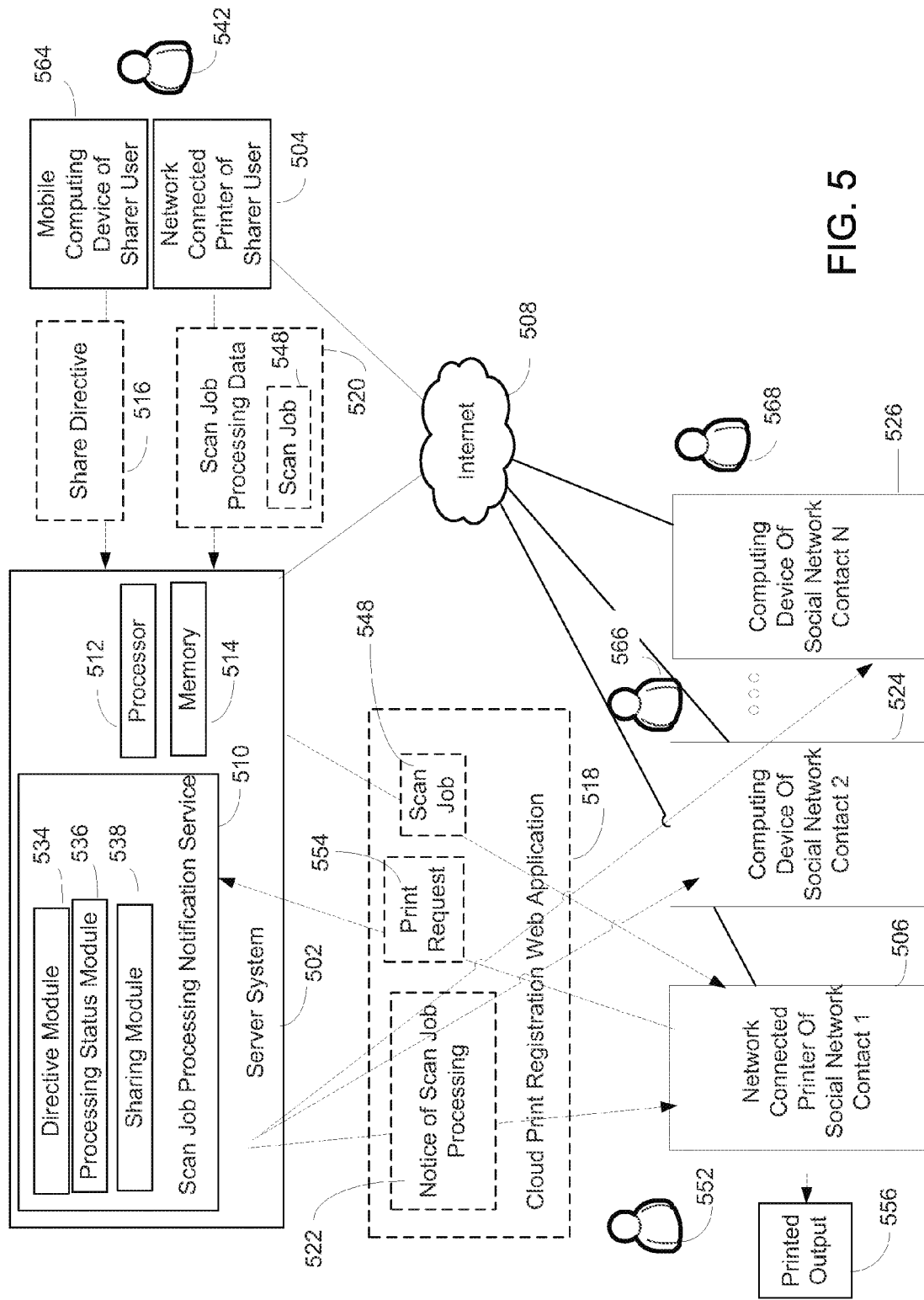
FIG. 5 is a block diagram illustrating a system according to various embodiments.

FIG. 5 is a block diagram illustrating a system according to various embodiments. FIG. 5 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 5 shows a server system 502 electronically connected to a mobile computing device 564, a sharer user internet connected printer 504, a Social Network Contact 1 internet connected printer 506, a Social Network Contact 2 internet connected printer 524, and a Social Network Contact N internet connected printer 526. Server system 502 represents generally any computing device or group of computing devices configured to send and receive internet requests, send and receive data, and/or otherwise communicate with, sharer user internet connected printer 504 and internet connected Social Network Contacts Printers "1-N" 506 524 526. In examples, server system 502 may be or include a server, desktop computer, notebook computer, mobile device, tablet computer, and/or any other computing device.

Mobile computing device 564 represents generally any portable computing device capable sending and receiving internet requests, including scan job share directives, and otherwise communicating with, server system 502.

Internet connected sharer user printer 504 represents generally any computing device or group of computing devices operable to perform a scanning operation to produce a scan job, and additionally operable to send and receive internet requests, send scan job processing data, scan jobs, and other data to, and otherwise communicate with, server system 502.

Internet connected Social Network Contacts "1-N" Printers 506 524 526 each represent generally a computing device that is operable to produce a printed scan job or printed content, and are additionally operable to send and receive internet requests and data, receive scan job processing information via a web application, and otherwise communicate with server system 502.

Internet 508 represents generally hardware components and computers interconnected by communications channels that allow sharing of resources and information over an internet or intranet network, or over a combination of both. Internet 508 may include a cable, wireless, fiber optic, or remote connection via a telecommunication link, an infrared link, a radio frequency link, or some combination of these, or any other connectors or systems that provide electronic communication. Internet 508 may also include intermediate proxies, routers, switches, load balancers, and the like. The paths followed by internet 508 between server system 502, sharer internet connected printer 504, and social network contact internet connected printers "1-N" 506 524 526 as depicted in FIG. 5 represent the logical communication paths between these devices, not necessarily the physical paths between the devices.

Server system 502 is shown to include a scan job processing notification service 510, a processor 512, and a memory 514. Scan job processing notification service 510 represents generally any combination of hardware and programming configured to enable a user of an internet connected printer to share a scan job with other computer users that are social network contacts of the sharing user. The service 510 includes a directive module 534, a processing status module 536, and a sharing module 538. Processor 512 represents generally any instruction execution system, such as a computer/processor based system or an ASIC (Application Specific Integrated Circuit), a computer, or other system that can fetch or obtain instructions or logic stored in memory 514 and execute the instructions or logic contained therein. Memory 514 represents generally any memory configured to store program instructions and other data.

In the example of FIG. 5, directive module 534, included within scan job processing notices service 510 and executing at server system 502, receives from the mobile computing device 564 a share directive 516 to send to social network contacts of a sharer user 542, via internet 508, processing information relating to scan jobs associated with sharer user 542. Processing status module 536 receives, from sharer user computing device 504, scan job processing data 520 indicative of processing of a scan job 548 associated with the sharer user 542. In this example, the processing data 520 is indicative of performance of a scan operation at sharer user printer 504 to create the scan job 548. In this example, the scan job processing data 520 that is received by the processing status module 536 from the sharer user computer 504 includes the scan job 548 itself. In examples, the share directive 516 and the scan job processing data 520 may be received by server system 502 over the internet 508 via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

Responsive to the processing status module's 536 receipt of the scan job processing data 520 with the scan job 548, the sharing module 538 sends a notice 522 of the scan job processing to the internet connected Social Network Contact 1 Printer 506 and Social Network Contact 2 Printer 524 via a web application 518. In an example, the notice of scan job processing 522 is sent to the Social Network Contact 1 Printer 506, Social Network Contact 2 Printer 524, and Social Network Contact N Printer 526 in a format that is displayable to social contacts 552 566 568 of the sharer user 542 via a visual display device (e.g. a monitor, touchscreen, or display screen) at the printers 506 524 526.

In the example of FIG. 5, the notification service 510 additionally provides to Social Network Contact 1 Printer 506, Social Network Contact 2 Printer 524, and Social Network Contact N Printer 526, via the web application 518, an opportunity or invitation 560 for the social network contact users 552 566 568 that utilize these computing devices "1-N" to print the scan job 548. In an example, the notification service 510 receives from the Social Network Contact 1 computing device 506 via the web application 518 a print request 554, initiated by a social network contact 552 of sharer user 542, to print the scan job 548. Responsive to receipt of the print request 554, the sharing module 538 sends the scan job 548 to the Social Network Contact 1 Printer 506 for printing. The Social Network Contact 1 Printer 506 in turn produces a printed hard copy 556 of the scan job 548.

Figure 6:
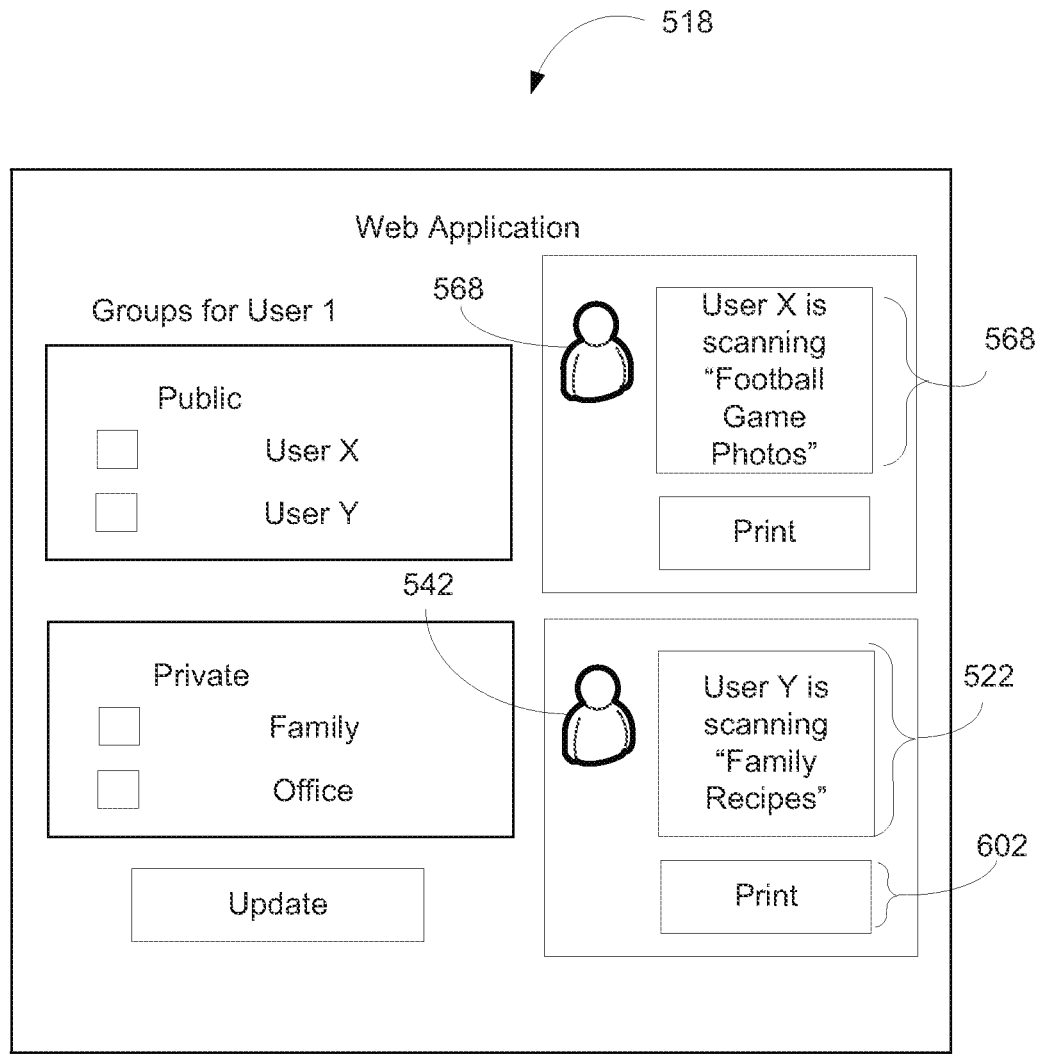
FIG. 6 is a screen shot of a web application.

FIG. 6, in view of FIG. 5, is an example screen shot of a web application 518 configured to communicate to social network contacts of sharer user 542 a notice of processing 522 of a scan job 548 associated with the sharer user 542. The screenshot provides an example of what a user 552 that is a social contact of the sharer user 542 might view at a visual display at Social Network Contact 1 Printer 506 as the result of the sharing module 538 at server system 502 sending, via the web application 518, notice 522 of the first processing of the scan job 548. The web application 518 additionally provides the social contact user 552 with a print instruction interface 602 to direct the sending of a print request 554 to the scan job processing notification service 510 executing at the server system 502. In the example of FIG. 6, the web application 518 as viewable by the social network contact 552 at Social Network Contact 1 Printer 506 also displays process status of jobs being printed by another social network contact 568 of social network contact 552.

The functions and operations described with respect to scan job processing notification service 510 and server system 502 may be implemented as a non-transitory computer-readable storage medium containing instructions executed by a processor (e.g., processor 512) and stored in a memory (e.g., memory 514). In a given implementation, processor 512 may represent multiple processors, and memory 514 may represent multiple memories. Processor 512 represents generally any instruction execution system, such as a computer/processor based system or an ASIC (Application Specific Integrated Circuit), a computer, or other system that can fetch or obtain instructions or logic stored in memory 514 and execute the instructions or logic contained therein. Memory 514 represents generally any memory configured to store program instructions and other data.

Figure 7:
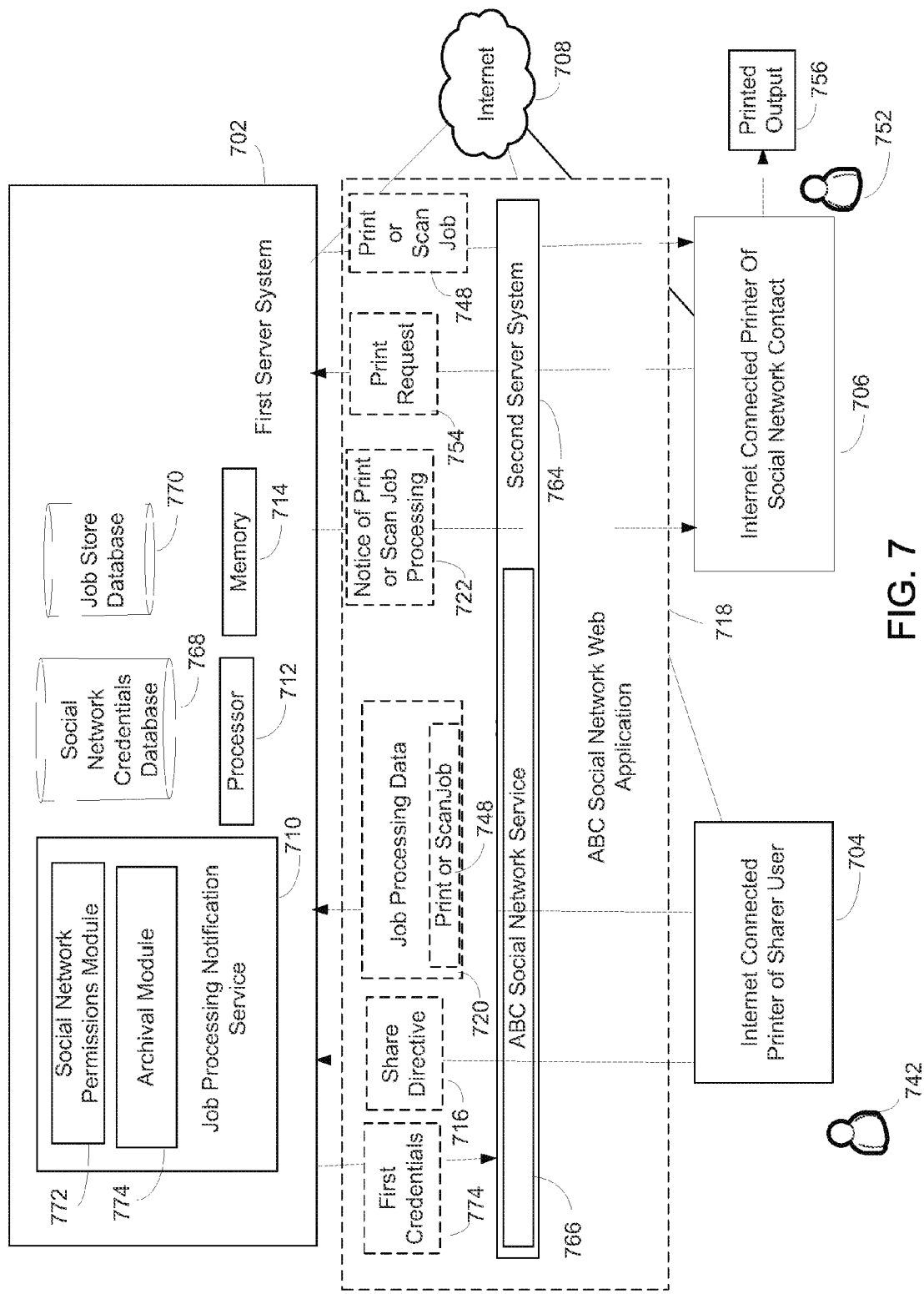
FIG. 7 is a block diagram illustrating a system according to various embodiments.

FIG. 7 is a block diagram illustrating a system according to various embodiments. FIG. 7 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 7 shows a first server system 702 electronically connected to a second server system 764 via the internet 708. First server system 702 represents generally any computing device or group of computing devices configured to send and receive internet requests, send and receive data, and/or otherwise communicate with second server system 764. Second server system 764 represents generally any computing device or group of computing devices that hosts an ABC Social Network Service 766 ("ABC SN Service"), and is configured to send and receive internet requests, send and receive data, and/or otherwise communicate with first server system 702. In examples, first server system 702 and second server system 764 may be or include a server, desktop computer, notebook computer, mobile device, tablet computer, and/or any other computing device. FIG. 7 also shows an internet connected sharer user printer 704 and an internet connected Social Network Contact Printer 706 each electronically connected to the second server system 764. Sharer user printer 704 and Social Network Contact Printer 706 each represent generally any computing device or group of computing devices operable to produce a printed print job or printed content, and additionally operable to send and receive internet requests, and other data to, and otherwise communicate with, second server system 764.

First server system 702 is shown to include a job processing notification service 710, a social network credentials database 768, a job store database 770, a processor 712, and a memory 714. Job processing notification service 710 represents generally any combination of hardware and programming configured to enable a user of an internet connected printer to share a print job or scan job (for purposes of discussion of FIGS. 7 and, 8, a "job") via a social networking application 718 with other computer users that are social network contacts of the sharing user. The service 710 includes a social network permissions module 772, and an archival module 774. Social network credentials database 768 represents generally a database, registry, lookup table or list that stores access credentials for social network services or applications of which the sharer user 742 is a member. Job store database 770 represents generally a database, registry, lookup table or list that stores jobs and information relating to the jobs, to enable an authorized social network contacts of the sharer user 742 to browse or search the job store database 770 for jobs to print. Processor 712 represents generally any instruction execution system, such as a computer/processor based system or an ASIC (Application Specific Integrated Circuit), a computer, or other system that can fetch or obtain instructions or logic stored in memory 714 and execute the instructions or logic contained therein. Memory 714 represents generally any memory configured to store program instructions and other data.

In the example of FIG. 7, a sharer user 742 at internet connected printer 704 sends a share directive 716, requesting that processing information 720 relating to a job or jobs associated with sharer user 742 be sent to social network contacts of the sharer user 742 via the ABC Social Network Web Application 718 ("ABC SN Web Application). In this example, the share directive 716 instructs that notice of processing of all jobs associated with sharer user 742 be automatically sent to a social network contact user printer 706 utilized by a social network contact 752. In another example, the share directive 716 may be specific to a particular print or scan job rather than a general directive. Upon receipt of the share directive, ABC SN Service 766 sends the share directive 716 to the first server system 702. The directive 716 is received by the job processing notification service 710.

In an example, the sending of the share directive 716 by the sharer user 742 may be preceded by the sharer user 742 installing a plug-in application at sharer user printer 704, the plug-in to modify or complement the ABC SN Web Application 718 accessed by the sharer user 742. In another example, the share directive 716 may be received from a computing device other than an internet connected printer, e.g. received from a smartphone, tablet computer, or other mobile computing device. In an example, the sending of the share directive 716 by the sharer user 742 at a mobile device may be preceded by the sharer user 742 installing a mobile device application at the mobile computing device, the plug-in to modify or complement the ABC SN Web Application 718 accessed by the sharer user 742 via the mobile device.

ABC SN Service 766 next receives from sharer user printer 704 job processing data 720, with a job 748, indicative of processing of a job 748 associated with the sharer user 742. ABC SN Service 766 sends the job processing data 720 to the first server system 702 and the job processing data 720 is received by the job processing notification service 710.

In this example, responsive to the job processing notification service's 710 receipt of the job processing data 720 with the job 748, the social network permissions module 772 accesses the social network credentials database 774 to retrieve a first access credential 774 for access to the ABC SN Web Application 718 (of which the sharer user 742 is a member). The social network permissions module 772 sends the first access credential 774 to the ABC SN Service 766 via the ABC SN Web Application 718.

After the first access credential 774 is sent by the permissions module 772 to the ABC SN Service 766, the job processing notification service 710 sends a notice 722 of the job processing to the ABC SN Service 766, for forwarding to Social Network Contact Printer 706 via the ABC SN Web Application 718. It should be noted that in other examples, the sending of the first access credential 774 to the ABC SN Service 766 or the ABC SN Web Application 718 may occur at a different point in the sequence of events, e.g., prior to the sharer user 704 sending the share directive 716.

The job processing notification service 710 additionally provides to the ABC SN Service 766, for forwarding to the Social Network Contact Printer 706 via the ABC SN Web Application 718, an invitation for the social network contact user 752 that utilizes internet connected printer 706 to print the job 748. In an example, the invitation may be in communicated via a graphic user interface that is made available to the social network contact 752 after a print sharing invitation has been communicated to social network contact 752 via the ABC SN Web Application 718, and an acceptance by social network contact 752 is communicated to the job processing notification service 710 via the ABC SN Web Application 718. After this invitation/acceptance transaction between the sharer user 742 and the social network contact 752 via the ABC SN Web Application 718, a graphic user interface is provided within a view of the ABC SN Web Application 718 provided to the social network contact user 752. Activation of the graphic user interface via by the social network contact user 752 (e.g., via a mouseclick, interaction with a touchpad, etc.) creates a print request 754 to be communicated to the first server system 702.

Social Network Contact Printer 706, at the initiation of social network contact user 752 via interaction with the graphic user interface, in turn sends to the ABC SN Service 766 a request 754 to print the job 748, and the ABC SN Service 766 sends the print request 754 to the first server system 702. Responsive to receipt of the print request 754, the job processing notification service 710 at the first server system 702 sends the job 748 to the ABC SN Service 766, for the service 766 to send to the Social Network Contact Printer 706 via the ABC SN Web Application 718. Upon Social Network Contact Printer 706's receipt of the job 748 via the ABC SN Web Application 718, the Social Network Contact Printer 706 produces a printed hard copy 756 of the job 748.

Figure 8:
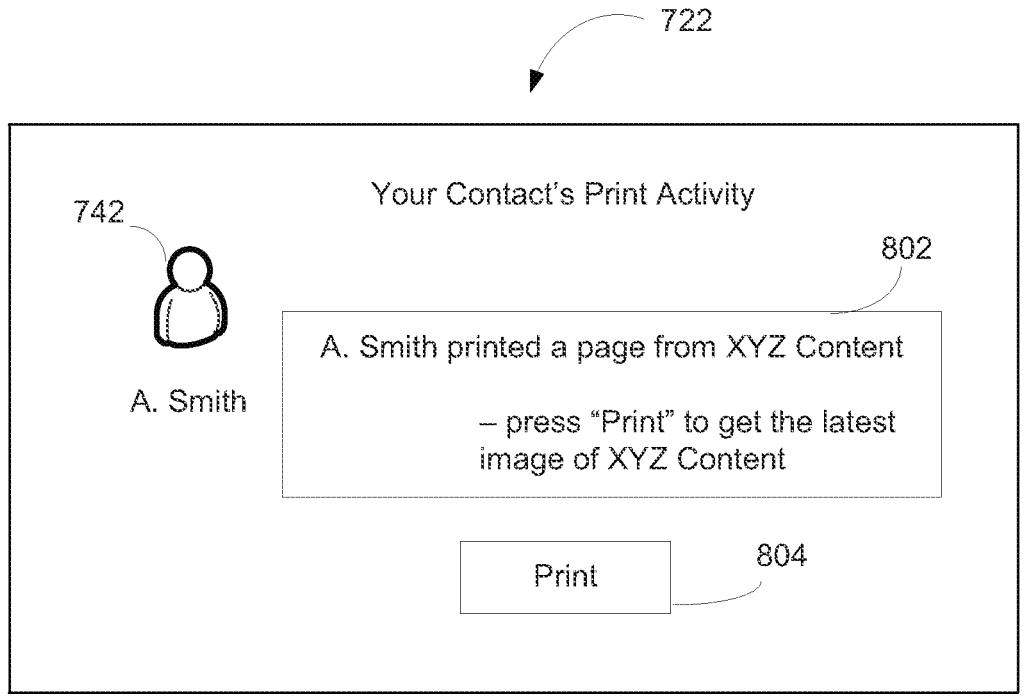
FIG. 8 is a screen shot of a social network application.

FIG. 8 is an example screen shot of the ABC SN Web Application 718, configured to communicate to a social network contact 752 of sharer user 742 a notice of processing 722 of a print job or scan job 748 associated with the sharer user 742. The screenshot provides an example of what the social network contact user 752 might view via the ABC SN Web Application 718 at Social Network Contact Printer 706. In this example, the notice 722 includes a communication 802 that the print job 748 includes XYZ content. The ABC SN Web Application 718 additionally provides the social network contact user 752 with a print instruction graphic user interface 804 to direct the sending of a print request 754 to the ABC SN Service 766, for the ABC SN Service 766 in turn forwards the print request 754 to the job processing notification service 710 executing at the first server system 702.

In an example, the job processing notification service 710 at first server system 702 additionally includes an archival module 774, configured to store print jobs and/or scan jobs in a job store database 768. In an example, the job store database 768 includes may include a copy of all jobs shared by the sharer user 742 via the ABC SN Web Application 718 over a specified timeframe. In an example the archival module 774 is configured to a receive request from the social network contact 752, and other authorized social network contacts of sharer user 742, to provide a copy of a stored print job or scan job, or information or data relating to the stored job. In examples, the archival module 774 enables the authorized social network contact to browse or search the job store database 770 for jobs to print. In another example, the archival module 774 receives search criteria from an authorized social network contact of the sharer user 742, ranks the stored jobs based upon the received criteria, and provides such rankings to the authorized social network contact via the ABC SN Web Application 718.

The functions and operations described with respect to job processing notification service 710 and first server system 702 may be implemented as a non-transitory computer-readable storage medium containing instructions executed by a processor (e.g., processor 712) and stored in a memory (e.g., memory 714). In a given implementation, processor 712 may represent multiple processors, and memory 714 may represent multiple memories. Processor 712 represents generally any instruction execution system, such as a computer/processor based system or an ASIC (Application Specific Integrated Circuit), a computer, or other system that can fetch or obtain instructions or logic stored in memory 714 and execute the instructions or logic contained therein. Memory 714 represents generally any memory configured to store program instructions and other data.

Figure 9:
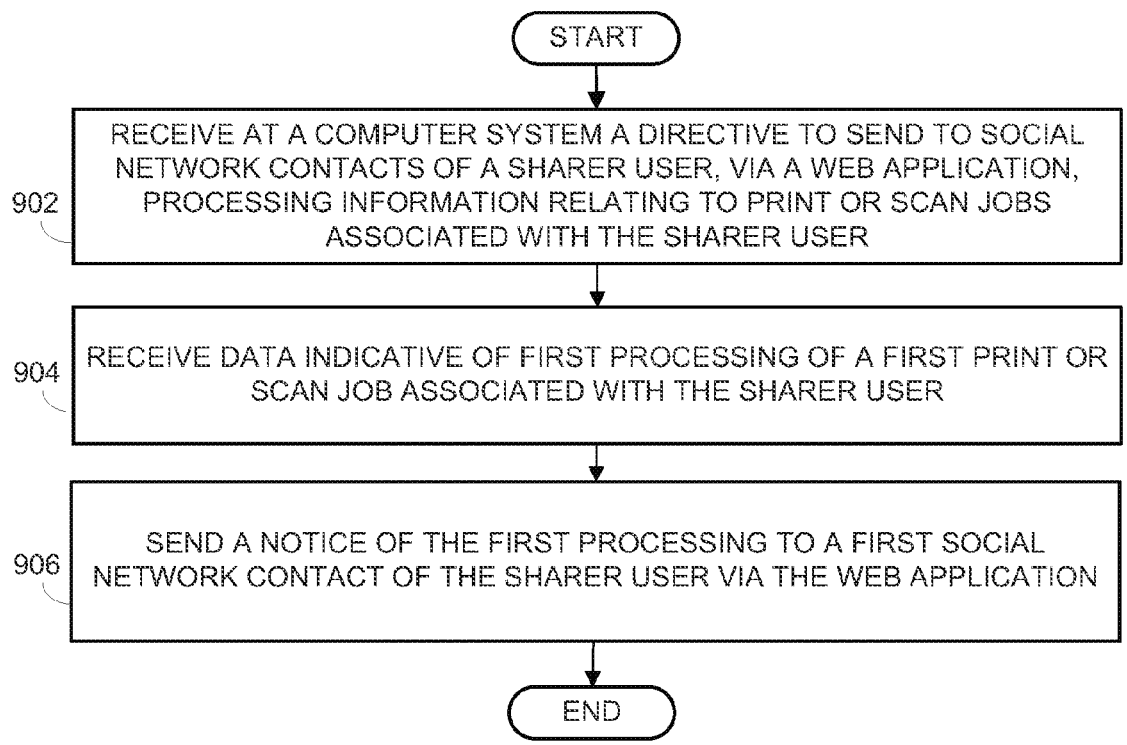
FIG. 9 is a flow diagram depicting steps taken to implement various embodiments.

FIG. 9 is a flow diagram of operation in a system according to various embodiments. In discussing FIG. 9, reference may be made to the diagrams of FIGS. 2 and 5 to provide contextual examples. Implementation, however, is not limited to those examples. Starting with FIG. 9, a directive is received at a computer system. The directive is for the computer system to send to social network contacts of a sharer user, via a web application, processing information relating to print or scan jobs associated with the sharer user (block 902). Referring back to FIGS. 2 and 5, directive module 234 or 534 may be responsible for implementing block 902.

Continuing with FIG. 9, data indicative of first processing of a print or scan job associated with the sharer user is received (block 904). Referring back to FIGS. 2 and 5, processing status module 236 or 536 may be responsible for implementing block 904.

Continuing with FIG. 9, a notice of the first processing is sent to a first social network contact of the sharer user via the web application (block 906). Referring back to FIGS. 2 and 5, sharing module 238 or 538 may be responsible for implementing block 906.

Various modifications may be made to the disclosed embodiments and implementations without departing from their scope. Therefore, the illustrations and examples herein should be construed in an illustrative, and not a restrictive, sense.

What is claimed is:
1. A computer system, comprising:
a memory; and
a processor to execute instructions stored in the memory to
receive, from a sharer user, a directive that instructs the computer system to send processing information of a print or scan job initiated by the sharer user to a first subset of social network contacts of the sharer user when the print or scan job is classified as a predetermined type, and send the processing information of the print or scan job to a second subset, different from the first subset, of the social network contacts of the sharer user when the print or scan job is not classified as the predetermined type;
receive data indicative of processing of a first print or scan job initiated by the sharer user;
determine a classification of the first print or scan job;

send a notice of the first print or scan job to a first social network contact of the sharer user based on the classification of the first print or scan job, and responsive to receipt via a web application of a request from the first social network contact to print the first print or scan job, send the first print or scan job to a computing device associated with the first social network contact, wherein a web application as viewable by the first social network contact displays process status of jobs being printed or scanned by other social network contacts of the first social network contact.

2. The computer system of claim 1, wherein the first print or scan job is a print job.

3. The computer system of claim 2, wherein the data indicative of processing the first printing or scan job includes a request for printing the first print job at a printer associated with the sharer user.

4. The computer system of claim 1, wherein the second subset includes all of the social network contacts of the sharer user.

5. The computer system of claim 1, wherein the computing device is a network connected printer.

6. The computer system of claim 1, wherein the web application is a printer application.

7. The computer system of claim 1, wherein the predetermined type of the print or scan job is a specified security type.

8. The computer system of claim 1, wherein the data is received from a network-connected printer associated with the sharer user.

9. The computer system of claim 1, wherein the processor is further to execute the instructions stored in the memory to access a social network credentials database that stores access credentials for social networks of which the sharer user is a member, and to provide a first credential to a first social network service.

10. The computer system of claim 9, wherein, responsive to receipt of a request from the first social network contact to print the print or scan job, the processor is to execute the instructions stored in the memory to send the print or scan job to a computing device associated with the first social network contact.

11. The computer system of claim 10, wherein the request is received from the first social network contact via a graphic user interface that is made available to the first social network contact after a sharing invitation and acceptance transaction between the first social network contact and a graphic user.

12. The computer system of claim 9, wherein the processor is to execute the instructions stored in the memory to store the print or scan job in a job store database, and to enable authorized social network contacts of the sharer user to browse or search the job store database for jobs to print.

13. The computer system of claim 12, wherein the processor is to execute the instructions stored in the memory to rank the stored jobs based upon criteria received from an authorized social network contact.

14. A non-transitory computer-readable storage medium containing instructions, the instructions when executed by a processor causing the processor to:

receive, from a sharer user, a directive that instructs a computer system to send processing information of a print job initiated by the sharer user to a first subset of social network contacts of the sharer user when the print job is classified as a predetermined type, and send the processing information of the print job to a second subset, different from the first subset, of the social network contacts of the sharer user when the print job is not classified as the predetermined type;

receive data indicative of processing of a first print job initiated by the sharer user;

determine a classification of the first print job;

send a notification of the processing of the first print job to a first social network contact of the sharer user based on the classification of the first print job, and responsive to receipt via a web application of a request from the first social network contact to print the first print or scan job, send the first print or scan job to a computing device associated with the first social network contact, wherein a web application as viewable by the first social network contact displays process status of jobs being printed or scanned by other social network contacts of the first social network contact.

15. The non-transitory computer-readable storage medium of claim 14, the instructions further causing the processor to:

responsive to receipt of a request from the first social network contact to print the print job, send the print job to a network-connected printer associated with the first social network contact.

16. A non-transitory computer-readable storage medium containing instructions, the instructions when executed by a processor causing the processor to:

receive, from a sharer user, a directive that instructs a computer system to send processing information of a scan job initiated by the sharer user to a first subset of social network contacts of the sharer user when the scan job is classified as a predetermined type, and send the processing information of the scan job to a second subset, different from the first subset, of the social network contacts of the sharer user when the scan job is not classified as the predetermined type;

receive data indicative of processing of a first scan job initiated by the sharer user;

determine a classification of the first scan job; and send a notification of the processing of the first scan job to a first social network contact of the sharer user based on the classification of the first print job, and responsive to receipt via a web application of a request from the first social network contact to print the first print or scan job, send the first print or scan job to a computing device associated with the first social network contact, wherein a web application as viewable by the first social network contact displays process status of jobs being printed or scanned by other social network contacts of the first social network contact.

17. The non-transitory computer-readable storage medium of claim 16, responsive to receipt of a request from the first social network contact to print the scan job, the processor is to send the first scan job to a computing device associated with the first social network contact.

* * * * *